United States Patent [19]

Langen et al.

[11] Patent Number: 5,361,584
[45] Date of Patent: Nov. 8, 1994

[54] HYDROSTATIC DRIVE SYSTEM

[75] Inventors: Alfred Langen, Grobostheim; Wolfgang Kraft, Karlstadt-Muhlbach, both of Germany

[73] Assignee: Linde Aktiengesellschaft, Germany

[21] Appl. No.: 64,485

[22] Filed: May 19, 1993

[30] Foreign Application Priority Data

May 22, 1992 [DE] Germany .............................. 4217074
Oct. 22, 1992 [DE] Germany .............................. 4235698

[51] Int. Cl.[5] .......................................... F16D 31/02
[52] U.S. Cl. ...................... 60/460; 60/466; 60/468; 60/493; 91/461
[58] Field of Search ............... 60/459, 460, 466, 468, 60/493, 494; 91/461, 517

[56] References Cited

U.S. PATENT DOCUMENTS

| | | | |
|---|---|---|---|
| 4,362,018 | 12/1982 | Torii | 60/493 X |
| 4,644,849 | 2/1987 | Tanaka | 60/466 X |
| 5,063,742 | 11/1991 | Yoshimatsu | 60/468 X |
| 5,101,630 | 4/1992 | Wagenseil | 60/460 |

FOREIGN PATENT DOCUMENTS

2220571  11/1982  Germany .
193910   11/1983  Japan ...................................... 60/466

*Primary Examiner*—Edward K. Look
*Assistant Examiner*—Hoang Nguyen
*Attorney, Agent, or Firm*—Webb Ziesenheim Bruening Logsdon Orkin & Hanson

[57] ABSTRACT

A hydrostatic drive system including a pump and a hydraulic motor in an open circuit which includes a feed line and a control valve in the feed line on the inflow side of the hydraulic motor to control the quantity of hydraulic pressure medium supplied to the hydraulic motor. A brake valve is located in the open circuit on the outflow side of the hydraulic motor to receive hydraulic pressure medium flowing out of the hydraulic motor. The control valve and the brake valve are constructed for independent actuation so that the functions of the control valve and the brake valve can be reversed when the direction of rotation of the hydraulic motor is reversed and the actuating pressure on the brake valve in the braking phase depends on the inflow pressure to the hydraulic motor independently of the actuating pressure on the control valve.

16 Claims, 4 Drawing Sheets

HYDROSTATIC DRIVE SYSTEM

BACKGROUND OF THE INVENTION

1. Field of the Invention

This invention relates generally to a hydrostatic drive system including a pump and a hydraulic motor located in an open circuit and more particularly to a hydrostatic drive system having a control valve which determines the quantity of hydraulic pressure medium on the inflow side of the hydraulic motor and a brake valve which is responsive to the quantity of hydraulic pressure medium on the outflow side of the hydraulic motor wherein the control valve and the brake valve are acted upon by the same pressure.

Brake valves are included in a hydrostatic drive system to prevent cavitation at the hydraulic motor. If brake valves are not provided in the system, cavitation will occur when energy is supplied to the hydraulic motor from the driven side in which case the motor operates as a pump. In this situation the pressure ratios in the two feed lines to the hydraulic motor are reversed which results in an insufficient supply of hydraulic medium to the hydraulic motor. Moreover, there is the risk that the hydraulic motor will exceed its rated speed. This situation can occur, for example, when a hydrostatic drive system is braked and/or during downhill travel.

Actuation of the brake valves depends on the pressure in the feed line to the inflow side of the hydraulic motor (the pressure on the inflow side of the hydraulic motor acts directly on a control surface of the brake valve). Each brake valve on the outflow side of the hydraulic motor is preloaded in the direction toward the closed position by a spring and is maintained in the open position by the pressure of the hydraulic medium on the inflow side of the hydraulic motor. As soon as the pressure of the hydraulic medium on the inflow side of the hydraulic motor falls below a certain predetermined value, the brake valve closes (as a rule this occurs continuously, i.e., with throttling in intermediate positions) and reduces the cross-section of the feed line on the outflow side of the hydraulic motor to produce a throttle effect.

2. Description of the Prior Art

Conventional hydrostatic drive systems include two brake valves, which may be located on a common axis, and one or two control valves on an axis spaced therefrom. Therefore, at least two parallel bores always have to be accommodated when the valves are located in housings.

German Patent No. 2,220,571 discloses integrating the brake valve in the control valve and the valve sub-assembly which is formed in this manner can be located on a common axis to eliminate the above-mentioned disadvantage. The valve sub-assembly is actuated by an actuating pressure. If the pressure on the inflow side of the hydraulic motor falls below the actuating pressure threshold in the braking phase, the actuating pressure decreases in proportion to the inflow pressure. However, this does not prohibit the occurrence of instabilities during certain operating phases. Particularly in the braking phase, i.e. when the pressure on the inflow side of the hydraulic motor falls below a certain value and as a result the valve sub-assembly containing the brake valve moves in the direction of closure, the outflow cross-section is reduced to produce a throttle effect, and the inflow cross-section is reduced at the same time in this known design. This causes the inflowing hydraulic pressure medium to be throttled back and the pressure on the inflow side falls even more sharply, because the valve sub-assembly moves further in the direction of closure. This interactive coupling effect leads to oscillations in the control system and braking becomes questionable.

SUMMARY OF THE INVENTION

The present invention provides a hydrostatic drive system wherein cavitation at the hydraulic motor is prevented which makes it possible to safely brake to a stop from every conceivable operating situation. Moreover, according to the invention, it is possible to construct the apparatus required for this purpose at a relatively low cost and with space-saving advantages.

The present invention is a hydrostatic drive system including a pump and a hydraulic motor in an open circuit. A control valve is provided on the inflow side of the hydraulic motor to determine the quantity of hydraulic pressure medium which flows to the hydraulic motor and a brake valve is provided on the outflow side of the hydraulic motor which is responsive to the quantity of outflowing hydraulic pressure medium. The control valve and the brake valve can be acted upon by the same pressure. The control valve and the brake valve are constructed so that they can be actuated separately from each other in the braking phase, and the actuating pressure on the brake valve in the braking phase is influenced substantially independently of the actuating pressure which acts on the control valve depending on the pressure on the inflow side of the hydraulic motor. Accordingly, the essential concept of the invention is to separately control the "inflow cross-section" and the "outflow cross-section" functions in the braking phase, even though the control valve and the brake valve are both actuated by the actuating pressure from a common actuating pressure source. Interactive coupling as in the prior art is therefore prevented. A vehicle equipped with a hydrostatic drive system according to the invention can be braked without vibrations. Furthermore, the advantage of locating the control valve and the brake valve on a single axis is retained which makes it possible to integrate the control valve and the brake valve in the base controller housing of the hydraulic motor, for example, which results in a compact space-saving construction.

An embodiment of the invention which requires only a few simply-constructed components is a hydrostatic drive system having a bleed line located between an actuating pressure transmitter and a control surface of the control valve. An actuating pressure branch line which is attached to a feed line on the inflow side of the hydraulic motor is connected to the bleed line. A throttle and a first check valve are connected in the actuating pressure branch line. The first check valve is located between the throttle and the connection of the actuating pressure branch line to the feed line and opens toward the feed line. According to this embodiment, the bleed line is provided with a second throttle connected upstream of the first throttle and a branch line which leads to a control surface of the brake valve is connected between the throttles. A second check valve opening toward the branch line is located between the second throttle and the connection point of the branch line. Under normal operating conditions, the second check valve prevents the actuating pressure in the branch line from decreasing through the actuating pressure transmitter. If the pressure in the inflow line to the hydraulic motor decreases, the first check valve in the bleed line opens and the actuating pressure acting on the control surface of the brake valve is reduced so that the brake valve closes. At the same time the throttle in the actuating pressure branch line maintains the actuating pressure at the control surface of the control valve substantially constant. In this manner, cavitation is prevented when energy is being supplied to the hydraulic motor from the driven side such as during downhill travel.

In accordance with another embodiment of a hydrostatic drive system according to the invention, an actuating pressure line is disposed between an actuating pressure transmitter and a control surface of the control valve. A throttle and a check valve are connected into a bleed line attached to a feed line on the motor inflow side. The check valve is located between the throttle and the connection of the bleed line to the feed line and opens toward the feed line. The bleed line is connected to a control surface of the brake valve and from the control surface to a supply line connected to a supply source of hydraulic medium in which a directional control valve is connected. The directional control valve can be switched against the resistance force of a spring from a starting position connecting one supply line to a reservoir line to an operating position connecting the supply line to a supply source of hydraulic medium. An actuating pressure branch line which is connected to the actuating pressure line of the control valve is connected to a control surface of the directional control valve. Thus, the brake valve is switched to its throttle position to prevent cavitation and at the same time hydraulic pressure medium is supplied to the feed line on the inflow side of the hydraulic motor.

It is advantageous if a check valve opening towards the control surface of the brake valve is located in the supply line to prevent a decrease in the actuating pressure causing the directional control valve to switch back to its starting position whereupon the actuating pressure could decrease in an uncontrollable manner towards the pressure medium reservoir. By this arrangement, a decrease in the actuating pressure which is proportional to the pressure on the inflow side of the hydraulic motor also acts on the control surface of the brake valve which is acted upon by the supply pressure. In addition, the hydraulic pressure medium can continue to flow so that a closure movement of the control valve is possible.

The hydrostatic drive system of the invention includes a throttle located in the actuating pressure line upstream of the control surface of the control valve and a check valve opening toward the control surface of the control valve is connected in parallel with the throttle. The check valve provides an immediate buildup of actuating pressure at the control surface of the control valve. Thus, when there is a decrease in actuating pressure, i.e., on braking, a different time-dependent behavior of the control valve and the brake valve can be achieved when braking to a stop by an appropriate selection of the cross-section of the throttle in the branch line. This prevents an insufficient supply of hydraulic medium to the hydraulic motor and eliminates vibrations in the drive system.

In a hydrostatic drive system in which the direction of motion of the hydraulic motor is reversible and in which a brake valve is associated with each of the two feed lines which are connected to the hydraulic motor and which can be attached alternately to the pump, it is advantageous if each brake valve is integrated into a control valve located in each feed line. Each control valve is constructed as a directional control valve and acts as a throttle in intermediate positions and has a first control surface to which an actuating pressure line is connected so that actuating pressure is supplied in this actuating pressure line when the control valve located in the direction of inflow to the hydraulic motor is actuated. Each control valve has a second actuating pressure surface to which a line is connected which branches off from a bleed line in which actuating pressure is supplied when the other control valve is acted upon. The hydrostatic drive system according to this embodiment of the invention can also be used as a reversible drive.

It may be advantageous if the two control valves have a common hollow cylindrical spring-centered sliding piston. First control surfaces are formed on the end faces of the sliding piston. Two chambers are located in the sliding piston and a brake valve constructed as a piston which is longitudinally displaceable against the resistance force of a spring is located in each chamber. Second control surfaces are formed on effective surfaces of the piston which act in opposition to the spring force. Radial openings, which can be closed by the piston, are provided to overlap with connection ducts and are located in the sliding piston. A unitary sliding piston such as this, with components disposed coaxially within it, has advantages in terms of size and cost of manufacture.

According to another advantageous embodiment of the invention, provision may be made for each control valve with its integrated brake valve to be a hollow cylindrical spring-centered sliding piston. Control surfaces are formed on the end faces of the sliding piston. One of the control surfaces can be acted upon by the pressure in the actuating pressure line downstream of the check valve and the other control surfaces can be acted upon by the pressure in the branch line or in the supply line. Connection ducts which are provided to overlap with connecting sections on the sliding piston are located in a housing.

In order to prevent insufficient filling of one of the feed lines, it is proposed according to another embodiment of the invention, that an auxiliary suction device is provided inside of each control valve. No additional space is required for this because of the integrated arrangement of the auxiliary suction device.

A complete understanding of the invention will be obtained from the following description when taken in connection with the accompanying drawings wherein like reference characters identify like parts throughout.

DESCRIPTION OF THE PREFERRED EMBODIMENTS

Figure 1:
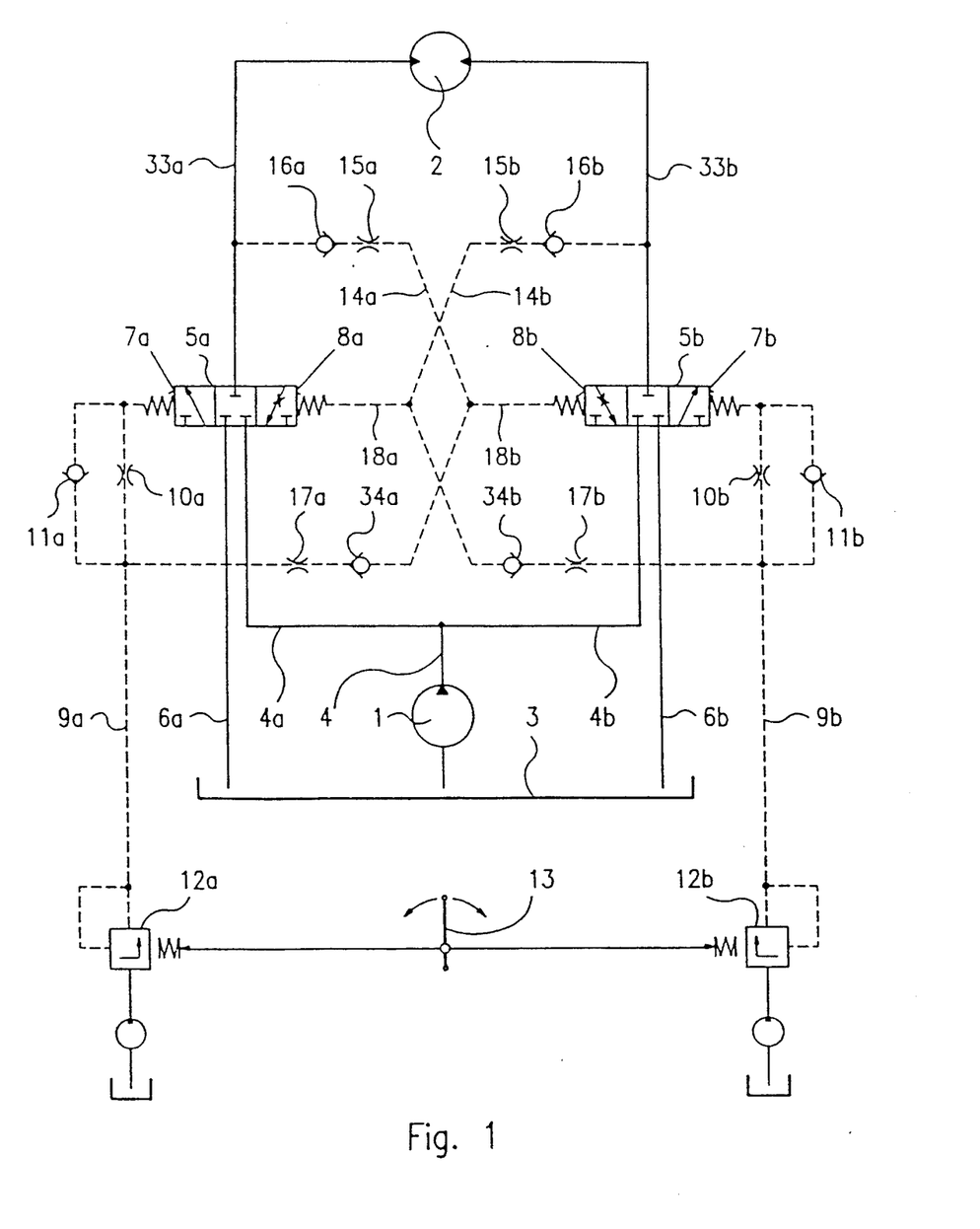
FIG. 1 shows a hydrostatic drive system according to the invention.

FIG. 1 of the drawings shows a hydrostatic drive system including a constant or adjustable volume pump 1 and a hydraulic motor 2 connected to the pump in an open circuit. Pump 1 withdraws hydraulic fluid medium from a reservoir 3 into a main feed line 4 which supplies two branch feed lines 4a and 4b. Branch feed lines 4a and 4b are connected, respectively, to spring-centered control valves 5a and 5b with an integral brake valve constructed as a 3/3 directional control valve, i.e., a valve with three connections and three positions. Control valves 5a and 5b are, respectively, connected directly to reservoir 3 by lines 6a and 6b and feed lines 33a and 33b, respectively, connect valves 5a and 5b to hydraulic motor 2.

In the center position, control valves 5a and 5b shut off the flow of hydraulic medium from branch feed lines 4a and 4b to feed lines 33a and 33b and a throttling effect is created. Each valve 5a and 5b has two control surfaces 7a and 8a and 7b and 8b. Actuating pressure lines 9a and 9b are connected, respectively, to control surfaces 7a and 7b of the valves. Each actuating pressure line 9a and 9b includes a throttle 10a or 10b and a check valve 11a or 11b which opens toward control surface 7a or 7b and is connected in parallel with a throttle 10a or 10b. Actuating pressure line 9a is connected to an actuating pressure transmitter 12a and actuating pressure line 9b is connected to an actuating pressure transmitter 12b. Actuating pressure transmitters 12a and 12b are mechanically coupled so that they can be operated by a common control member 13.

A bleed line 14a branches off actuating pressure line 9a upstream of throttle 10a and is connected to feed line 33a between control valve 5a and hydraulic motor 2. Bleed line 14a includes a first throttle 15a and a first check valve 16a downstream thereof which opens toward feed line 33a. A second throttle 17a is located in bleed line 14 upstream of first throttle 15a. A branch line 18b leads from bleed line 14a to control surface 8b of valve 5b and is connected between first throttle 15a and second throttle 17a. A second check valve 34a is located in bleed line 14a between second throttle 17a and branch line 18b and opens toward branch line 18b.

Similar to the arrangement for control valve 5b, a bleed line 14b branches off actuating pressure line 9b upstream of throttle 10b and is connected to feed line 33b between control valve 5b and hydraulic motor 2. Bleed line 14b includes a first throttle 15b and a first check valve 16b downstream thereof which opens toward feed line 33b. A second throttle 17b is located in bleed line 14b upstream of first throttle 15b. A branch line 18a leads from bleed line 14b to control surface 8a of valve 5a and is connected between first throttle 15b and second throttle 17b. A second check valve 34b is located in bleed line 14b between second throttle 17b and branch line 18a and opens toward branch line 18a.

The operation of the hydrostatic drive system shown in FIG. 1 of the drawings is described hereinafter. When control member 13 is moved to the left as shown in FIG. 1 of the drawings a certain actuating pressure, e.g., a preselected pressure between 0 and 25 bar, is provided at actuating pressure transmitter 12a. This actuating pressure builds up in actuating pressure line 9a and the hydraulic medium passes through check valve 11a to control surface 7a in control valve 5a. The pressure of the hydraulic medium moves control surface 7a to the right as shown in FIG. 1 of the drawings against the force of the spring to open control valve 5a. Feed line 4a is thereby connected to supply line 33a on the inflow side of the hydraulic motor and hydraulic pressure medium flows from pump 1 through open control valve 5a to hydraulic motor 2 to drive the hydraulic motor. The volume of hydraulic pressure medium flowing to hydraulic motor 2 determines the rotational speed of the hydraulic motor and depends on the size of the opening in control valve 5a which is determined by the force of the actuating pressure acting on control surface 7a.

The actuating pressure in actuating pressure line 9a is also communicated to bleed line 14a. Since the pressure in feed line 33a is generally greater than the actuating pressure, check valve 16a will remain closed. The actuating pressure also acts on the control surface 8b of control valve 5b through branch line 18b which is connected to bleed line 14a. The pressure of the hydraulic medium in branch line 18b displaces control surface 8b to the right as shown in FIG. 1 of the drawings against the force of the spring so that valve 5b is opened and hydraulic pressure medium on the outflow side can flow from hydraulic motor 2 through line 33b to reservoir 3.

When a vehicle equipped with the herein described hydrostatic drive system is travelling downhill energy from the driven side is stored in hydraulic motor 2 so that the hydraulic motor operates as a pump. The pressure in feed lines 33a and 4a on the inflow side of the hydraulic motor therefore decreases, so that at a predetermined pressure level, which is less than the actuating pressure, check valve 16a opens and a decrease in pressure occurs in bleed line 14a between first throttle 15a and second throttle 17a. Since branch line 18b is connected to bleed line 14a between first throttle 15a and second throttle 17a, the pressure at control surface 8b also decreases and control valve 5b is moved to the left as shown in FIG. 1 of the drawings by the force of the spring, which is greater than the pressure of the hydraulic medium on control surface 8b. This movement decreases the cross-section of feed line 33b on the outflow side, so that the pressure medium backs up and hydraulic motor 2 is braked. Thus, in this operating situation control valve 5b acts as a brake valve.

In contrast, the position of control valve 5a remains unchanged (i.e., open) since the pressure of the hydraulic medium acting on control surface 7a of control valve 5a is maintained by check valve 11a and throttles 17a and 10a.

The inflow to and outflow from hydraulic motor 2 are thus controlled separately, which means that the hydraulic motor can be braked without vibrations. This mode of operation is ensured even during enforced braking when the actuating pressure is discontinued. In this situation check valves 34a and 34b ensure that the actuating pressure in branch lines 18b and 18a is only reduced in proportion to the pressure in lines 33a and 33b, and is not uncontrollably conducted to the reservoir by pressure transmitters 12a and 12b.

Different rates of movement of control valves 5a and 5b are obtained by selecting different aperture sizes for throttles 10a and 10b; 15a and 15b and 17a and 17b.

Figure 2:
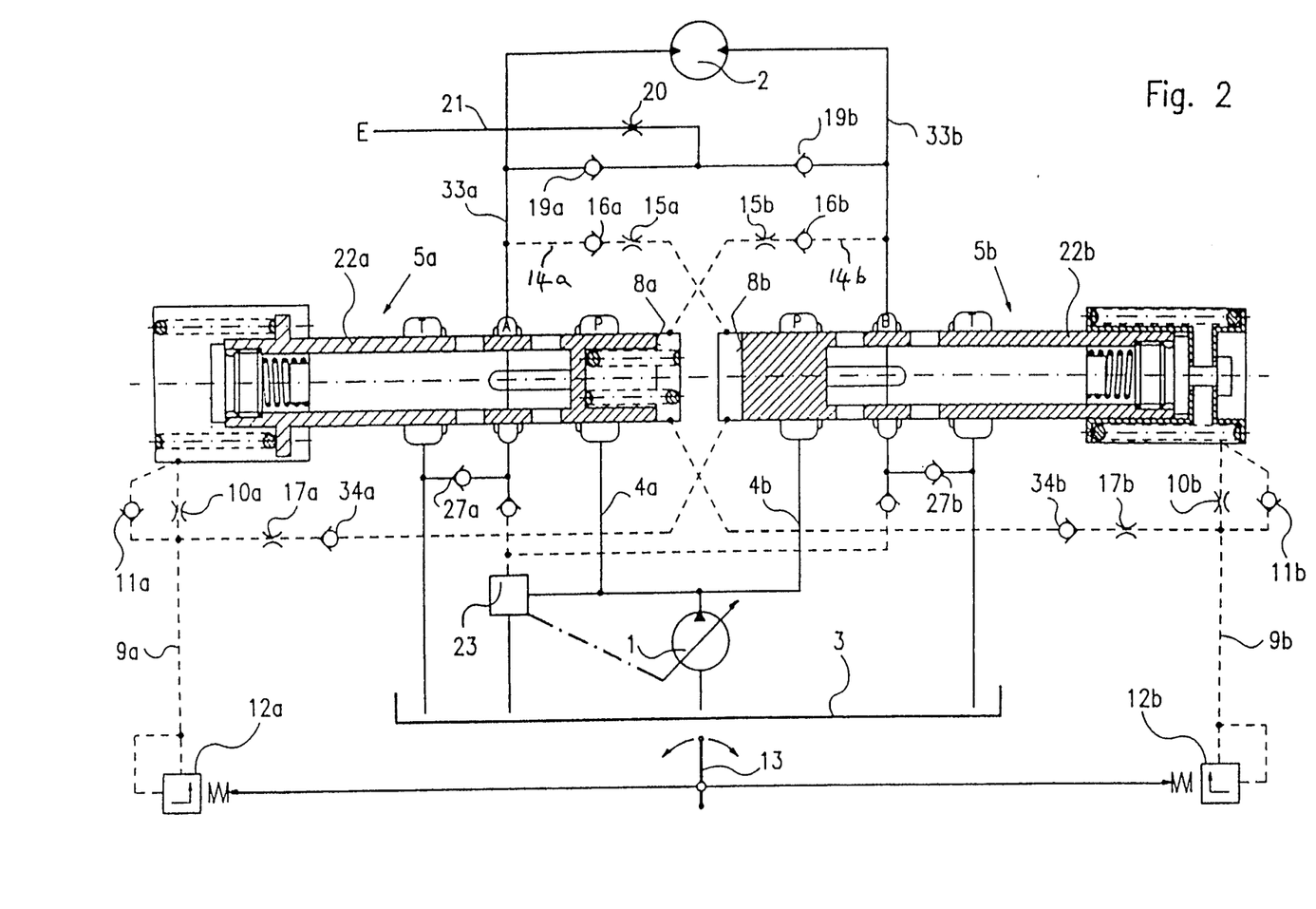
FIG. 2 is another embodiment of the drive system shown in FIG. 1 including the details of the valves.

FIG. 2 of the drawings shows a hydrostatic drive system similar to that shown in FIG. 1 of the drawings with the control valves shown in detail and including a load sensing controller. Additionally, the hydrostatic drive system shown in FIG. 2 of the drawings is augmented by hydraulic fluid from a supply source E which has a stabilizing effect on the behavior of the system. Check valves 19a and 19b are located in a line 21 which is connected to supply source E and to feed lines 33a and 33b. Check valves 19a and 19b open toward feed lines 33a and 33b, respectively. A throttle 20 is included in line 21 upstream of check valves 19a and 19b.

Control valves 5a and 5b with their integrated brake valves are shown in detail in FIG. 2 of the drawings. Each control valve has a sliding piston 22a or 22b which is longitudinally displaceable inside a housing and which is centered in the housing by a spring. The spring centering of a piston may be achieved in various different ways. For example, centering is achieved in the valve shown in FIG. 2 of the drawings by a combined tension and compression spring arrangement. Annular ducts A, B, P and T are formed in the housing of each valve. Annular ducts A and B are connected to a hydraulic consumer such as hydraulic motor 2. Annular duct P is connected to pump 1 and annular duct T is connected to reservoir or tank 3. A load compensator is located inside of each sliding piston 22a and 22b for cooperation with adjustable pump 1. The pump is provided with a load sensing controller 23, which is well-known to those skilled in the art, to sense the feed pressure of the pump and the pressure in a load sensing line. The end faces of sliding pistons 22a and 22b are connected to actuating pressure lines 9a and 9b, respectively, and directly to bleed lines 14b and 14a, respectively. Separate branch lines 18a and 18b, in the system shown in FIG. 1 of the drawings, are therefore eliminated. The annular ducts located in the valve housings are positioned to overlap with the corresponding connection sections on sliding pistons 22a and 22b. Hydraulic pressure medium can flow into feed line 33a or 33b through an auxiliary suction valve 27a or 27b which is connected to reservoir 3 if insufficient hydraulic medium is present in feed line 33a or 33b.

Figure 3:
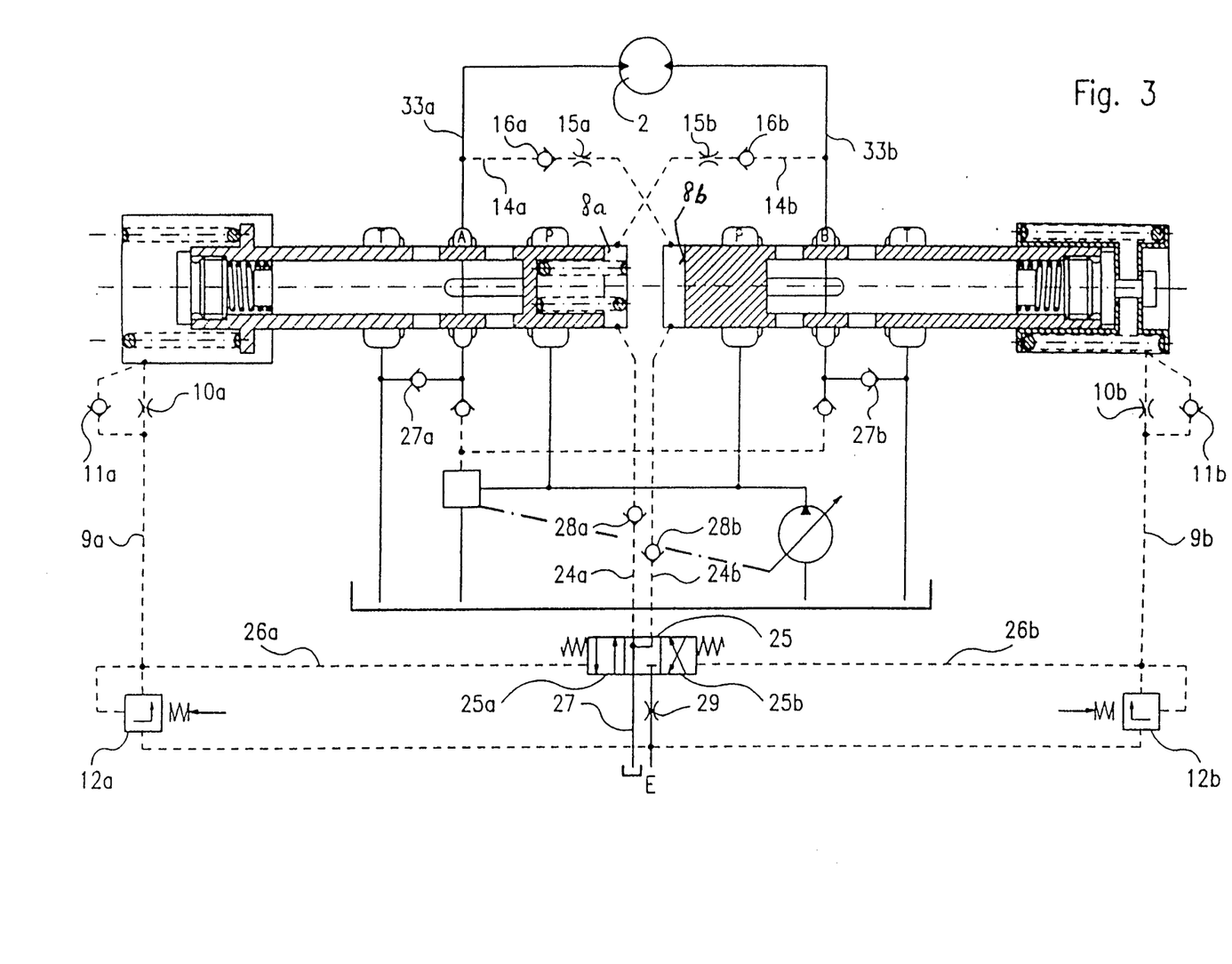
FIG. 3 is a third embodiment of the drive system shown in FIG. 1 with the valves shown in detail.

The hydrostatic drive system shown in FIG. 3 of the drawings differs from the system shown in FIG. 2 of the drawings in that control surfaces 8a and 8b are not acted on by a hydraulic pressure medium in an actuating pressure line 9a or 9b. Instead, control surfaces 8a and 8b are acted on by a hydraulic pressure medium which is stored in a feed line 33a or 33b on the inflow side of the hydraulic motor at the same time that braking is effected. Supply lines 24a and 24b have check valves 28a and 28b opening toward control surfaces 8a and 8b, respectively, for this purpose. Supply lines 24a and 24b are connected to a directional control valve 25 and, respectively, to control surfaces 8a or 8b. Hydraulic medium is supplied to directional control valve 25 and to actuating pressure transmitters 12a and 12b from a hydraulic medium source E. Directional control valve 25 is spring-centered and has control surfaces 25a and 25b. An actuating pressure branch line 26a connects actuating pressure line 9a to control surface 25a and an actuating pressure branch line 26b connects actuating pressure line 9b to control surface 25b. In the central starting position of directional control valve 25, both supply lines 24a and 24b are connected to a reservoir line 27. In the operating position, directional control valve 25 is displaced to the left or to the right as shown in FIG. 3 of the drawings, depending on which actuating pressure transmitter 12a or 12b is actuated. The space in front of each control surface 8a and 8b of control valves 5a and 5b on the outflow side is acted on by the pressure in supply line 24a or 24b, and control valve 5a or 5b serves as a brake valve which is open when there is sufficient pressure on the inflow side in feed supply 4a and 4b. If the pressure on the inflow side decreases, control valve 5a or 5b on the outflow side is closed and a braking effect is thereby produced and pressure medium is supplied to the feed line on the inflow side as a result of the open check valve on the inflow side. These two measures inhibit cavitation on the inflow side.

A throttle 29 is located in the supply line from hydraulic medium source E upstream of directional control valve 25 and downstream of the supply lines for actuating pressure transmitters 12a and 12b. Throttle 29 maintains a predetermined pressure level in the supply lines to pressure transmitters 12a and 12b, even when directional control valve 25 has switched and check valves 16a and 16b have opened. Check valves 28a and 28b prevent the actuating pressure on control surfaces 8a and 8b from uncontrollably decreasing through line 27 to the reservoir when the actuating pressure is reduced to 0 bar. The subsequent auxiliary flow of pressure medium from the reservoir which is necessary to close the control valve is also provided by this means.

Figure 4:
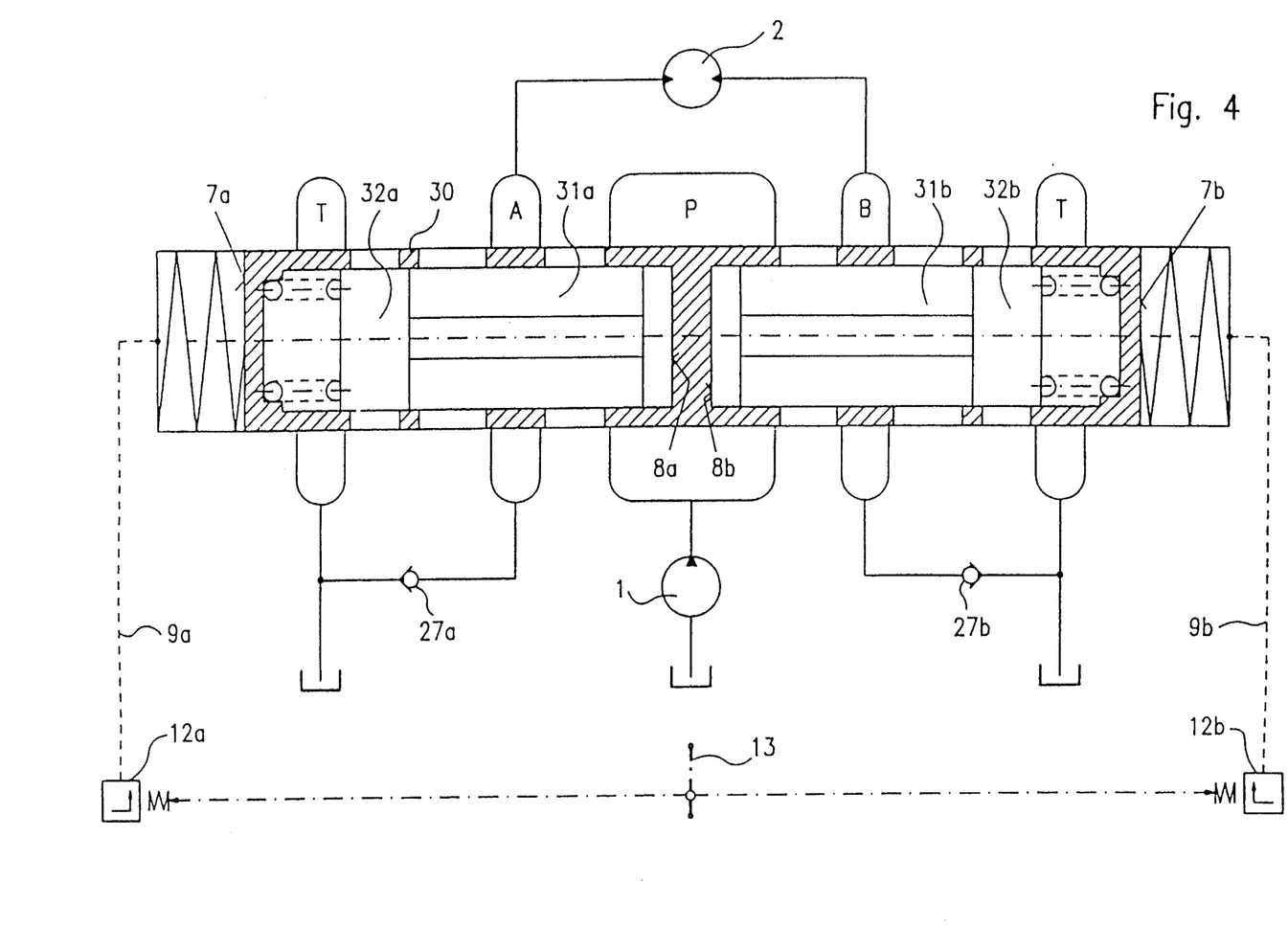
FIG. 4 is a drive system having a modified valve.

FIG. 4 of the drawings illustrates an embodiment of a hydrostatic drive system according to the invention in which the control valves have a common hollow cylindrical spring-centered sliding piston 30 which is longitudinally displaceable in a housing. The opposite end faces of sliding piston 30 form valve control surfaces 7a and 7b. Two chambers 31a and 31b are formed inside sliding piston 30 and pistons 32a and 32b each of which is longitudinally displaceable against the force of a spring are located, respectively, in chambers 31a and 31b inside sliding piston 30 which functions as a brake valve. Control surfaces 8a and 8b are formed on an effective surface of a piston 32a or 32b, and act to move the piston against the force of a spring. Sliding piston 30 is provided with spaced radial openings which serve to overlap with annular channels A, B, P and T formed in the housing as described above. These radial openings can be closed by pistons 32a and 32b. The arrangement described constitutes a purely throttle-controlled system.

Auxiliary suction valves 27a and 27b which are shown in FIGS. 2, 3 and 4 of the drawings may be integrated directly into the brake valve-control valve combination, if desired. This arrangement requires less space and is particularly advantageous if auxiliary suction valves 27a and 27b are constructed to make it possible to introduce auxiliary pressure medium by suction in every operating situation, i.e., even when the sliding piston is closed.

The foregoing describes preferred embodiments of the invention and is given by way of example only. The invention is not limited to any of the specific features described herein, but includes all such variations thereof within the scope of the appended claims.

We claim:

1. A hydrostatic drive system including a pump and a reversible hydraulic motor in an open circuit including a feed line for a hydraulic pressure medium, a first valve connected in said feed line on the inflow side of said reversible hydraulic motor to control the flow of hydraulic pressure medium to said reversible hydraulic motor, and a second valve on the outflow side of said reversible hydraulic motor to receive hydraulic pressure medium flowing out of said reversible hydraulic motor, wherein said first valve and said second valve are constructed for independent actuation and are actuated by an actuating pressure whereby each of said first valve and said second valve is reversible to alternately operate as a control valve and brake valve in accordance with the direction of rotation of said reversible hydraulic motor, whereby the actuating pressure on said second valve in the braking phase depends on the inflow pressure to said reversible hydraulic motor.

2. A hydrostatic drive system as set forth in claim 1 wherein each of said first valve and said second valve has a control surface and said open circuit includes an actuating pressure transmitter, an actuating pressure line connected between said control surface of said first valve and said actuating pressure transmitter and a feed line on the inflow side of said reversible hydraulic motor, said open circuit including a bleed line connected between said actuating pressure line and said feed line, a first throttle and a first check valve in said bleed line, said first check valve being located between said first throttle and the connection of said bleed line to said feed line on the inflow side of said reversible hydraulic motor and opening toward said feed line, a second throttle in said bleed line upstream of said first throttle, said open circuit including a branch line connected to said bleed line between said first throttle and said second throttle, said branch line connected to said control surface of said second valve, and a second check valve opening toward said branch line in said bleed line between said second throttle and the connection point of said bleed line to said branch line.

3. A hydrostatic drive system as set forth in claim 1 wherein each of said first valve and said second valve has a control surface, and said open circuit includes an actuating pressure transmitter, an actuating pressure line connected between said control surface of said first valve and said actuating pressure transmitter, said open circuit including a bleed line connected to said feed line on the inflow side of said reversible hydraulic motor, a throttle in said bleed line, and a check valve in said bleed line between said throttle and the connection of said bleed line to said feed line and opening toward said feed line, wherein said bleed line is connected between said control surface of said second valve, said circuit including a hydraulic medium supply source and a supply line, a directional control valve having a control surface located in said supply line and connected to said hydraulic second medium supply source and said control surface of said brake valve, said directional control valve including resistance springs for adjustment of said directional control valve from a first starting position wherein one of said supply lines is connected to a reservoir line in said open circuit and a second operating position wherein said supply line is connected to said hydraulic medium supply source, and a line connecting said control surface of said directional control valve to said actuating pressure line of said first valve.

4. A hydrostatic drive system as set forth in claim 3 including a check valve located in said supply line opening toward said control surface of said second valve.

5. A hydrostatic drive system as set forth in claim 2 including a throttle in said actuating pressure line upstream of said first surface of said control valve and a check valve opening toward said control surface of said first valve connected in parallel with said throttle.

6. A hydrostatic drive system as set forth in claim 3 including a throttle in said actuating pressure line upstream of said first surface of said control valve and a check valve opening toward said control surface of said first valve connected in parallel with said throttle.

7. A hydrostatic drive system as set forth in claim 4 including a throttle in said actuating pressure line upstream of said first surface of said control valve and a check valve opening toward said control surface of said first valve connected in parallel with said throttle.

8. A hydrostatic drive system as set forth in claim 2 including a brake valve connected to each of the two feed lines connected to said reversible hydraulic motor, each of said brake valves alternately connected to said pump, wherein each of said brake valves is integrated in a control valve disposed in each of said two feed lines and each of said control valves is constructed as a directional control valve having a throttling effect in intermediate positions and having a first control surface connected to an actuating pressure line, whereby actuating pressure is present in said actuating pressure line when said control valve located in the direction of inflow to said reversible hydraulic motor is actuated, said directional control valve having a second control surface connected to said bleed line connected to said feed line on the inflow side of said reversible hydraulic motor wherein a pressure which depends on the actuating pressure is conducted when the other control valve is acted upon.

9. A hydrostatic drive system as set forth in claim 3 including a brake valve connected to each of the two feed lines connected to said reversible hydraulic motor, each of said brake valves alternately connected to said pump, wherein each of said brake valves is integrated in a control valve disposed in each of said two feed lines and each of said control valves is constructed as a directional control valve having a throttling effect in intermediate positions and having a first control surface connected to an actuating pressure line, whereby actuating pressure is present in said actuating pressure line when said control valve located in the direction of inflow to said reversible hydraulic motor is actuated, said directional control valve having a second control surface connected to said bleed line connected to said feed line on the inflow side of said reversible hydraulic motor wherein a pressure which depends on the actuating pressure is conducted when the other control valve is acted upon.

10. A hydrostatic drive system as set forth in claim 4 including a brake valve connected to each of the two feed lines connected to said reversible hydraulic motor, each of said brake valves alternately connected to said pump, wherein each of said brake valves is integrated in a control valve disposed in each of said two feed lines and each of said control valves is constructed as a directional control valve having a throttling effect in intermediate positions and having a first control surface connected to an actuating pressure line, whereby actuating pressure is present in said actuating pressure line when said control valve located in the direction of inflow to said reversible hydraulic motor is actuated, said directional control valve having a second control surface connected to said bleed line connected to said feed line on the inflow side of said reversible hydraulic motor wherein a pressure which depends on the actuating pressure is conducted when the other control valve is acted upon.

11. A hydrostatic drive system as set forth in claim 5 including a brake valve connected to each of the two feed lines connected to said reversible hydraulic motor, each of said brake valves alternately connected to said pump, wherein each of said brake valves is integrated in a control valve disposed in each of said two feed lines and each of said control valves is constructed as a directional control valve having a throttling effect in intermediate positions and having a first control surface connected to an actuating pressure line, whereby actuating pressure is present in said actuating pressure line when said control valve located in the direction of inflow to said reversible hydraulic motor is actuated, said directional control valve having a second control surface connected to said bleed line connected to said feed line on the inflow side of said reversible hydraulic motor wherein a pressure which depends on the actuating pressure is conducted when the other control valve is acted upon.

12. A hydrostatic drive system as set forth in claim 8 wherein each of said control valves has a common hollow cylindrical spring-centered sliding piston, said sliding piston having opposite end faces which form said control surfaces and said sliding piston having two chambers, a spring in each of said chambers and a piston in each of said chambers longitudinally displaceable against the force of said spring in each of said chambers, a second control surface formed on an effective surface of each of said pistons adapted to act in opposition to the force of said spring and a plurality of spaced radial openings located in said sliding piston which can be closed by said sliding piston.

13. A hydrostatic drive system as set forth in claim 8 wherein each of said control valves with its integrated brake valve is a hollow cylindrical spring-centered sliding piston, control surfaces formed by the opposite end faces of said sliding piston, one of said control surfaces acted on by the pressure in said actuating pressure line downstream of said throttle with said check valve connected in parallel, and the other of said control surfaces acted on by the pressure in said branch line or in said supply line, spaced connection sections on said sliding piston and connection ducts located in a housing overlapping said spaced connection sections on said sliding piston.

14. A hydrostatic drive system as set forth in claim 8 including an auxiliary suction device inside of said control valve.

15. A hydrostatic drive system as set forth in claim 12 including an auxiliary suction device inside of said control valve.

16. A hydrostatic drive system as set forth in claim 13 including an auxiliary suction device inside of said control valve.

* * * * *

UNITED STATES PATENT AND TRADEMARK OFFICE
CERTIFICATE OF CORRECTION

PATENT NO. : 5,361,584
DATED : November 8, 1994
INVENTOR(S) : Alfred Langen and Wolfgang Kraft It is certified that error appears in the above-indentified patent and that said Letters Patent is hereby corrected as shown below:

Column 6 Line 21 after "downhill" insert --,--.

Claim 3 Line 43 Column 9 after "hydraulic" delete "second".

Claim 3 Line 44 Column 9 "brake" should read --second--.

Signed and Sealed this

Twenty-first Day of February, 1995

Attest:

BRUCE LEHMAN

Attesting Officer    Commissioner of Patents and Trademarks